United States Patent [19]
Peille

[11] 3,977,931
[45] Aug. 31, 1976

[54] METHOD AND MACHINE FOR THE CONTINUOUS MANUFACTURE OF PANELS

[75] Inventor: Jean-Marie Peille, Esperaza, France

[73] Assignee: Societe de Participations Etudes et Realisations (SPER), Esperaza, France

[22] Filed: Aug. 22, 1974

[21] Appl. No.: 499,709

[30] Foreign Application Priority Data
Aug. 28, 1973   France .............................. 73.31116

[52] U.S. Cl. ................... 156/78; 264/46.2; 264/46.6; 425/224; 425/DIG. 119; 428/71; 428/310
[51] Int. Cl.² ......................................... B32B 5/20
[58] Field of Search ............... 264/46.2, 46.6, 46.3, 264/46.5, 45.8, 54, 45.4; 156/78, 79; 425/224, DIG. 119; 428/71, 310

[56] References Cited
UNITED STATES PATENTS

| | | | |
|---|---|---|---|
| 2,841,205 | 7/1958 | Bird | 264/46.2 |
| 3,231,439 | 1/1966 | Voelker | 264/46.2 |
| 3,240,846 | 3/1966 | Voelker | 264/46.2 |
| 3,270,103 | 8/1966 | Kurtz | 264/45.4 |
| 3,389,196 | 6/1968 | Stahl | 264/45.8 |
| 3,410,931 | 11/1968 | Johnson | 264/45.8 |
| 3,630,819 | 12/1971 | Conger | 264/45.8 |
| 3,748,217 | 7/1973 | Mar et al. | 156/78 |

Primary Examiner—Edward G. Whitby
Attorney, Agent, or Firm—Seidel, Gonda & Goldhammer

[57] ABSTRACT

The invention relates to a method for the continuous manufacture of panels of synthetic material with at least one surface covered with a rigid facing by means of a machine comprising: devices for the continuous advance of the facings; a distributing station to deposit, on a lower facing, in liquid form, expandable synthetic material which will constitute the inner layer of the panel; and continuous conveyor means, arranged above and below the plane of advance of the panels.

This method comprises the steps of:

applying, on to the synthetic material in the liquid state, at the outlet of the distributing depositor, a sheet facing of non-woven material, relatively porous, gradually traversable by said synthetic material, subjecting said material thus covered to a gauging operation before the non-woven material is traversed by this material in the course of expansion, and, after the gauging on to the non-woven material which has become adhesive by the traversal of the synthetic material and then presenting itself in the jell state, applying the rigid facing in plate form, by means of continuous conveyor means.

3 Claims, 3 Drawing Figures

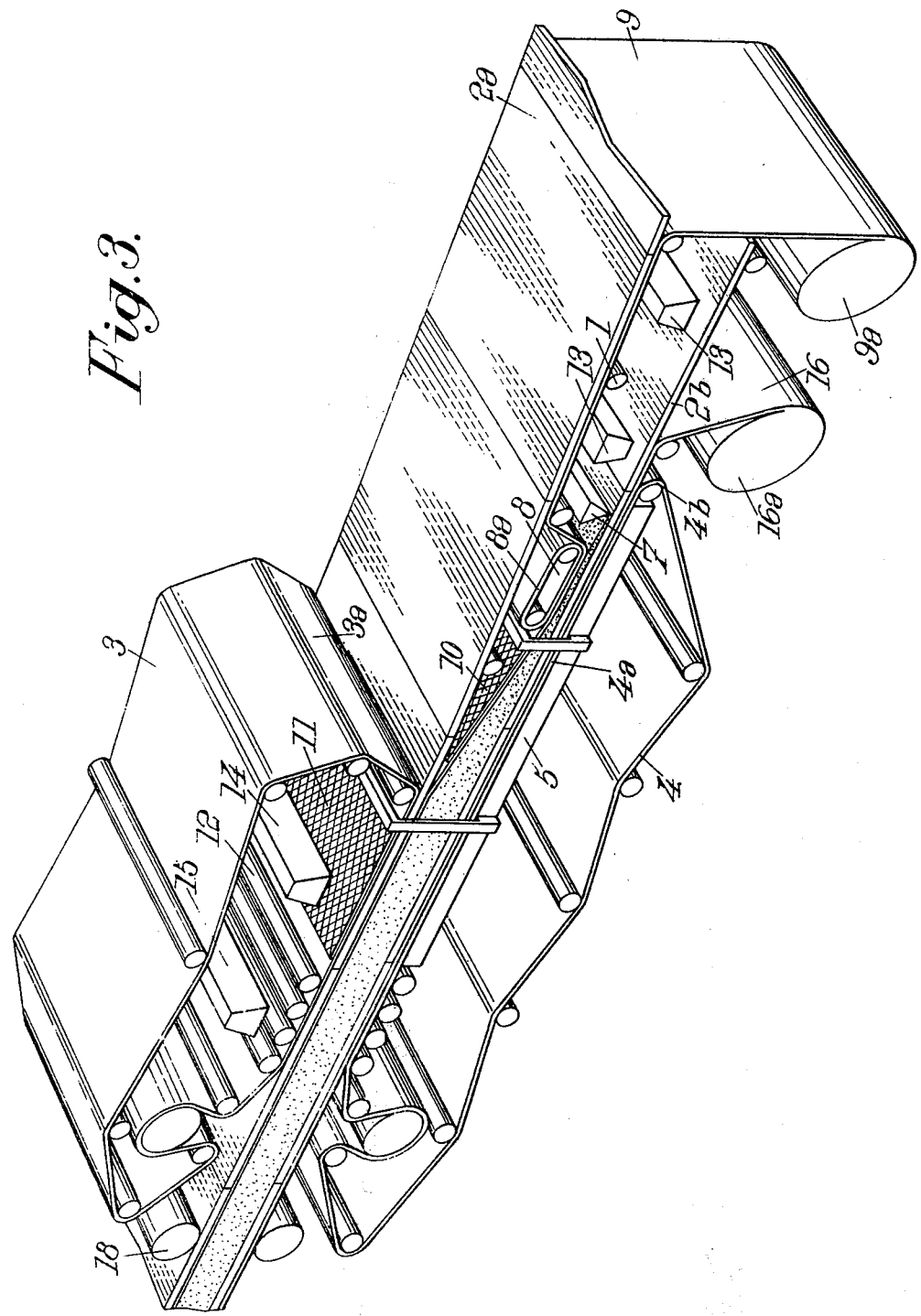

METHOD AND MACHINE FOR THE CONTINUOUS MANUFACTURE OF PANELS

The invention relates to a method and a machine for the continuous manufacture of panels, for example of polyurethane foam, of which at least one surface is covered with a rigid facing.

A method for the continuous production of panels of plastics material is already known, which method consists of delivering on to a moving support, a reactive liquid which is covered, on its upper surface, with a facing in sheet form, which is supplied by means of support members, such as feed metering plates, cooperating with endless conveyor belts forming a spout between the moving surfaces on which the synthetic material composite structure advances.

It is possible to apply this method to obtain plates or blocks of synthetic material having surfaces covered with rigid facings.

To achieve this result, two known methods may be used.

The first method consists of cutting up the blocks into plates. On the surfaces of these plates, the rigid facings are glued in a second operation with an adhesive.

The second method consists of spraying a chemical reactant in the liquid state on to the rigid facings, positioned one after the other, and to apply on to the synthetic cellular material in expansion, a second series of rigid facings.

These two methods generally use spray systems for the deposition of the gluing material.

It is a particular object of the invention to avoid the losses of material inherent in such spraying systems.

It is a further object to eliminate the atmospheric pollution due to this spraying.

To this end, according to the invention, there is provided a method for the continuous manufacture of panels of synthetic material, with at least one surface covered with a rigid facing, by means of a machine comprising:

devices for the continuous advance of the facings, a distributing station for depositing in liquid form expandable synthetic material which will constitute the inner layer of said panel on to a lower facing, continuous conveyor belts, arranged above and below the plane of advance of the panels, said method being characterized in that:

There is first applied on to the synthetic material in the liquid state, at the outlet of the distributing station, a facing in sheet form of a relatively porous, non-woven material, capable of being gradually traversed by said synthetic material, The thus coated material is then subjected to a gauging operation before the non-woven material is traversed by this material in the course of expansion, Lastly, there is applied after the gauging, on to the non-woven material which has become tacky through traversal of the synthetic material in the gel state, the rigid facing presented the form of a plate by means of continuous conveyor belts.

It should here be noted that the porosity of a non-woven material must be previously determined as a function of various factors and especially:

the viscosity of the chemical reactant in the liquid state, the change in this viscosity when the chemical reaction is effected. It might be modified according to the structure of the fibrous sheet. It may be reduced by the addition in the course of manufacture of the non-woven material of a porophore agent, for example that mentioned in French patent No. 1,600,008.

The invention also relates to a machine for the application of the aforementioned method, said machine comprising:

devices for the continuous advance of rigid facings in sheet form, a distributing station depositing the expandable synthetic material in liquid form on to the lower facing of the panel to be produced, a first shaper to control the expansion of the synthetic material and at least two continuous conveyor belts, arranged above and below the plane of advance of the panels to apply the facings on to this synthetic material, said machine being characterized in that the front application point of the upper conveyor belt on to the facings is shifted backward in the direction of advance of the panel to be produced in the machine, with respect to the front application point of the lower conveyor belt, so as to leave between the first shaper and the application point of the rigid facings placed in contact on the synthetic material by said upper conveyor belt, a space, of which the distance of free travel permits the gradual impregnation of a sheet of non-woven material delivered upstream of the first shaper and applied by the latter on to the synthetic material.

Other features of the invention will be described below with reference to the accompanying drawings, in which:

FIG. 3 is a view showing in perspective the components of the machine of FIG. 1.

The method according to the invention for the continuous manufacture of panels of synthetic material with at least one surface covered with a rigid facing, is achieved by means of a machine comprising devices known in themselves for the continuous advance of the facings, the delivery of the synthetic filling material which has to constitute the core of the panel to be produced, and shaping means for controlling the expansion of said material to ensure after expansion, the maintenance of the gauged material coated with its facings.

Figure 1:
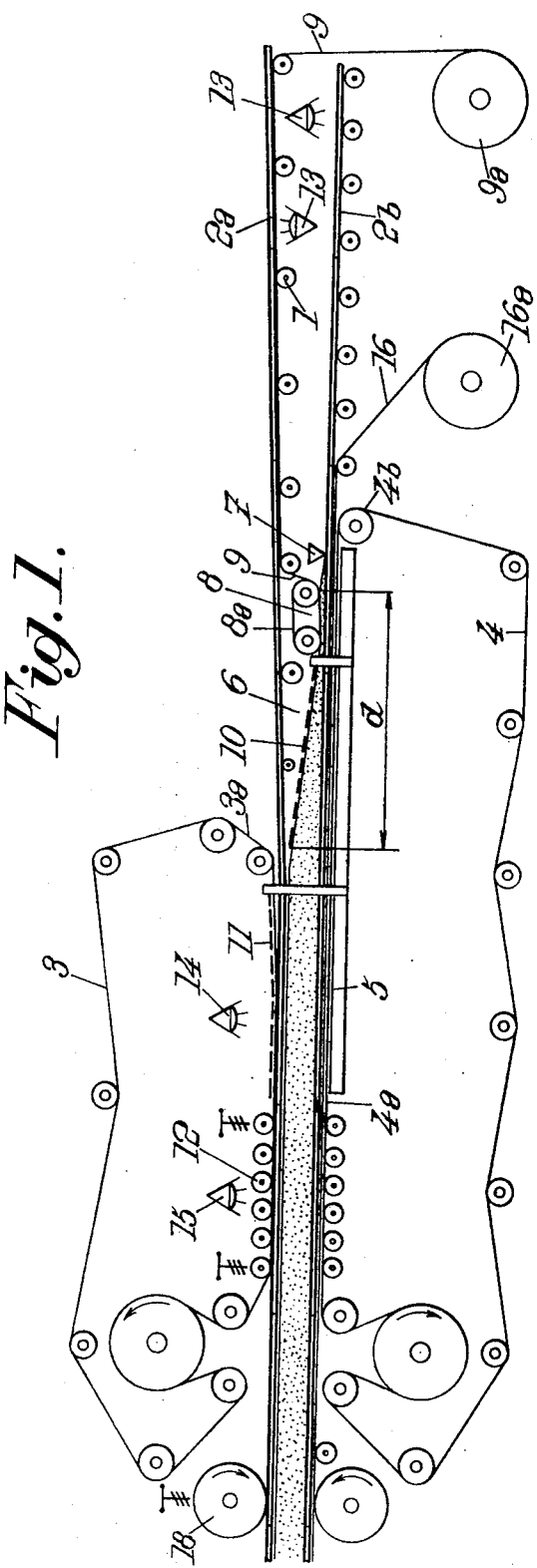
FIG. 1 is a longitudinal diagramatic section showing a machine for the application of the method according to the invention.
Figure 2:
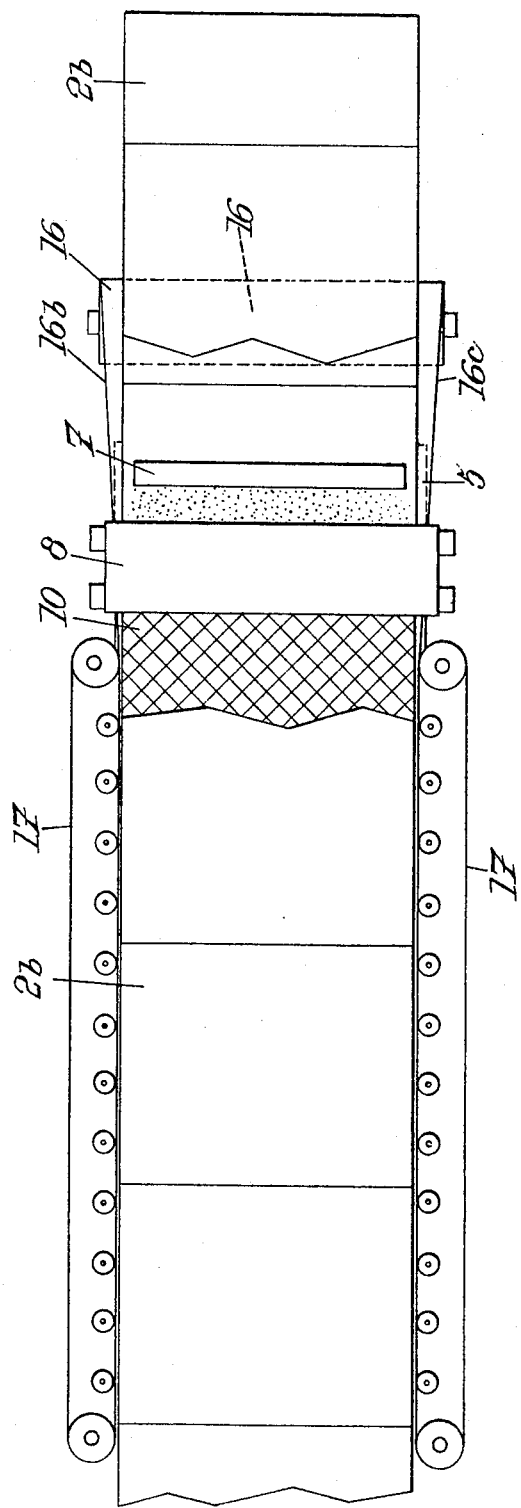
FIG. 2 is a diagramatic view from above of the machine, showing the lateral shapers of the panels to be produced.

With reference to FIGS. 1 to 3, the machine comprises, for upstream to downstream, roller conveyors 1, feeding, with rigid facings 2a, 2b, in the form of discontinuous plates, a shaping spout between the surfaces of which the elements and constituent materials of the panels to be produced, advance.

The shaping spout is constituted principally by two endless conveyor belts, one 3, arranged above the plane of advance of the material to be produced, the other 4, arranged below this plane. The upper strand 4a of the endless strip 4 is held by a fixed plate 5 over the portion of its length where the expandable synthetic material is delivered into the spout and is gradually converted into gel. The endless belt 3, intended essentially to apply the rigid facing 2a onto the pre-gauged synthetic material, has its front point of application 3a on the facings 2a shifted with respect to the front application point 4b of the lower belt 4, on the facings 2b, so as to define, between the two front application points 3a, 4b, of said belts on to the rigid facings 2a, 2b, a zone 6 where the pre-gauging of the panel can be obtained to control the expansion of the synthetic material having to constitute the core of the panel, is effected.

The synthetic material is delivered in the liquid state by a distributing ramp 7, arranged immediately upstream of the first shaper 8, the second shaper being constituted by endless belts 3 and 4, described previously;

It is in the zone 6, corresponding to the pregauging phase of the method, that there is to be found the double function of facing with a sheet 9 of a non-woven material to ensure, on the one hand, the control of the expansion of the synthetic material delivered in the liquid state, and on the other hand, the adhesive power of this non-woven facing, when it is traversed gradually by said synthetic material.

The facing in sheet form 9 is delivered by a roller 9a, known in itself, whose position in the drawings is given to facilitate the reading thereof, but of course, another more favorable position may be adopted.

To associate the two functional properties of the sheet facing 9 of non-woven material, there is arranged immediately following the distributing ramp 7 for synthetic material, the first shaper 8, constituted for example by an endless belt 8a, enabling the introduction, in the dry state, on to the liquid reactant, of the sheet 9 of non-woven material whose porosity is such that it will be able to advance, without being traversed by the liquid reactant, over a distance corresponding to the expansion phase of said material, so that over this distance d, a flexible carpet, with a meshed structure 10 flexible and deformable in all directions, ensures the application without folds in the sheet 9 of non-woven material, on to the material in the course of expansion. At the end of the pre-gauging course, when the non-woven material leaves the down-stream end of the carpet 10, the synthetic material then being in the gel state, has soaked into and then traversed the non-woven material, which renders it adhesive to then enable its facing in contact and its gluing with the corresponding surface of the rigid facing 2a in plate form.

There are provided, several pressure means acting on the continuous conveyor belt 3, to maintain the application of the rigid facings 2a on to the non-woven sheet, rendered adhesive.

These pressure means are constituted for example by a carpet 11, also of mesh structure, flexible and deformable in all directions, which is supported on the outer surface of the lower strand of the transfer belt 3.

At the end of the fixed plate 5 and of the carpet 11, there are provided, on both sides of the plane of advance of the panel obtained, pressure rollers 12. At the outlet from the shaping spout bounded by the belts 3 and 4, there is provided a pair of traction cylinders 18 for the extraction of the panel obtained from the machine.

At least one heating ramp 13 is provided at the level of the member for feeding the plates intended to constitute the desired rigid facings of the panel, in order to facilitate, by a thermo effect, the adhesion of said facings with the synthetic material which has to constitute the core of the panel. Heating ramps 14 and 15 are also provided at the level of the pressure means of the endless belt 3 to complete, of necessary, the adhesion between the rigid facing plates and the filling material.

The machine is completed by roller 16a to deliver a sheet 16 between the rigid plates 2b, forming the lower facing of the panel and the application belt 4, supported by the fixed plate 5. The sheet, for example of paper, has the purpose, on the one hand of closing the joints between the plates 2b which follow, and to contain the synthetic material on the lateral sides of the panel to be obtained.

To do this, as shown in FIG. 2, the marginal edges 16b, 16c of the paper sheet 16 are folded back in a manner known in itself along the lateral edges of the panel to be obtained, and are held by endless conveyor belts 17 which closed the shaping spout of the machine laterally.

In FIG. 3, for simplicity of reading the drawing, the lateral conveyor belts 17 have been left out. Similarly, again to facility reading, the width of the paper sheet 16 has been shown as constant, whilst in fact, this sheet is wider than the width of the panels, to permit covering their lateral sides.

In an actual application of the present invention, the non-woven material 16 is comprised of 48% fibers, 25% cellulose and 27% binding agents. The material is formed utilizing well-known paper fabrication techniques. The weight in square meters of the resultant composition comprising the unwoven material 16 is from 30 to 80 grams per square meter. While this range is satisfactory, it has been found that a range of 30 to 45 grams per square meter is preferable. It has also been found that the transversal time of the expanding synthetic matter through the non-woven material may be regulated by adding, during the fabrication, to the non-woven material 1 to 10% grams per square meter of polyvinyl alcohol.

While rigid panels 2a and 2b may be formed from various materials which will be compatible with and adhere to the synthetic substance during its gel-like state, it has been found that plaster plaques, "particle" panels and panels of expanding perlite may be advantageously used in connection with the present process.

As used herein, the term "gauging" means that the thickness of the synthetic filler material is regulated with precision prior to the expansion stage thereby controlling the ultimate expansion of the material.

I claim:

1. A process for the continuous production of panels having a core of expandable synthetic material distributed in the form of a reactive liquid passing into a gel-like state and then into a solid state, a lower facing, an upper facing, at least one of said facings being formed of a rigid material compatible for adhering on contact with the synthetic material during the gel-like state, said process comprising the steps of:

placing on said lower facing said expandable synthetic material in liquid form;

applying to the top of said synthetic material during its liquid state a sheet of non-woven material, relatively porous, which can be progressively transversed by said synthetic material;

submitting said synthetic material during its liquid state and said sheet of non-woven material to a gauging operation before said non-woven material is traversed by said synthetic material;

permitting said synthetic material to freely expand thereby progressively traversing said synthetic material after said gauging step until said synthetic material changes into a gel-like state and said non-woven material has become sticky due to the transversal of said material; and applying to said non-woven material after it has become sticky said upper facing.

2. A process in accordance with claim 1, further comprising the steps of:

applying a continuous sheet to both the underside of said lower facing of a plurality of said panels and to the lateral sides of said panels thereby providing a protective covering for said lower facing and lateral sides of said plurality of panels.

3. A machine for the continuous manufacture of panels comprising:

means for continually advancing an upper and a lower rigid facing through said machine;

means for disposing in liquid form an expandable synthetic material onto said lower facing;

first shaper means for applying a sheet of porous, non-woven material to said synthetic material so deposited on said lower facing during its liquid state and for gauging said material;

means for permitting progressive impregnation of said non-woven material by said synthetic material during its gel-like state as said upper and lower facings are drawn through said machine over a predetermined distance; and means for restraining the expansion of said synthetic material after said upper and lower facings have passed through said means for permitting progressive impregnation of said non-woven material.

* * * * *